Aug. 28, 1934.   J. A. MAURER, JR   1,971,457
OPTICAL SYSTEM
Filed April 6, 1931    3 Sheets-Sheet 1

INVENTOR
J. A. MAURER, JR
BY
ATTORNEY

Aug. 28, 1934.  J. A. MAURER, JR  1,971,457
OPTICAL SYSTEM
Filed April 6, 1931   3 Sheets-Sheet 2

INVENTOR
J. A. MAURER, JR.
BY
ATTORNEY

Aug. 28, 1934. J. A. MAURER, JR 1,971,457
OPTICAL SYSTEM
Filed April 6, 1931  3 Sheets-Sheet 3

INVENTOR
J. A. MAURER, JR.
BY
ATTORNEY

Patented Aug. 28, 1934

1,971,457

UNITED STATES PATENT OFFICE 1,971,457

OPTICAL SYSTEM

John A. Maurer, Jr., New York, N. Y., assignor to Radio Corporation of America, a corporation of Delaware Application April 6, 1931, Serial No. 528,099

11 Claims. (Cl. 88—24)

This invention relates to optical systems, and more particularly to such optical systems as are used in phonographic apparatus, such as that of the photoelectric type, for producing a narrow linear image of either a primary or a secondary light source upon an image area such, for example, as the sound-track of a sound and picture film.

The present application pertains more particularly to such systems in which the dimensions of the final image are dependent upon the characteristics of the system rather than on the dimensions of the light-source or of a slit serving as a secondary source, and accordingly is related to my applications filed concurrently herewith and pertaining to collateral inventions of the same general kind and issued as patents numbered 1,947,564; 1,947,565; 1,947,566 and 1,947,567 February 20, 1934. The present application, however, is characterized by the employment of a primary group of lenses having a sphero-cylindrical power and arranged to form a horizontal virtual image of the light-source reduced in its vertical dimension.

One object of this invention is to produce such an optical system of reasonably high light efficiency and at the same time capable of producing an image of the necessary lateral attenuation.

Another object of this invention is to produce such a system which is capable of reasonable facility of manufacture.

Another object of this invention is to produce such a system which is capable of being manufactured at a reasonable cost under modern production methods.

Another object of this invention is to produce such a system which is adapted to reasonable facility and accuracy in installation.

Another object of this invention is to produce such a system which is adapted to or capable of using present commercially available lenses or lenses adapted to present commercial manufacture.

The light-source is indicated at "1".

The first or primary group of lenses is indicated at "2".

The objective or secondary group of lenses is indicated at "3".

The film or other image area is indicated at "4".

The cylindrical component of the objective, if any, is indicated at "5".

The diaphragm or limiting aperture is indicated at "6".

The objective diaphragm, where used, is indicated at "6'".

The first image of the source is indicated at "7".

The final functioning image is indicated at "8".

And a final virtual image is indicated at "8'".

Such other reference-numerals as may be common to two or more figures will be hereinafter more specifically pointed out.

The light in all cases is assumed to pass from left to right.

Figure 1:
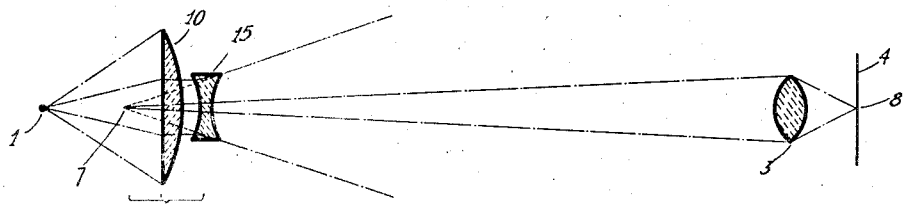
Figure 1 is a vertical section of a preferred form of the invention.
Figure 2:
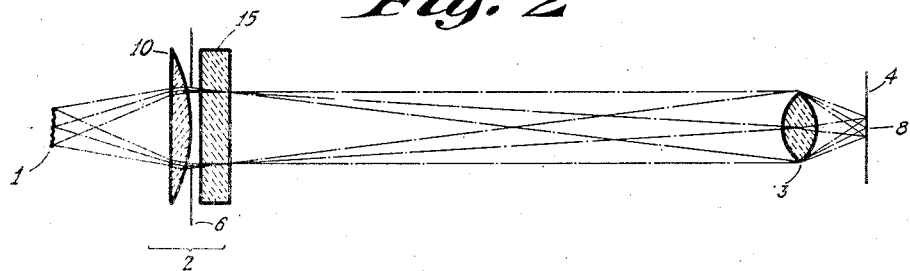
Figure 2 is a horizontal section corresponding to Figure 1.
Figure 3:
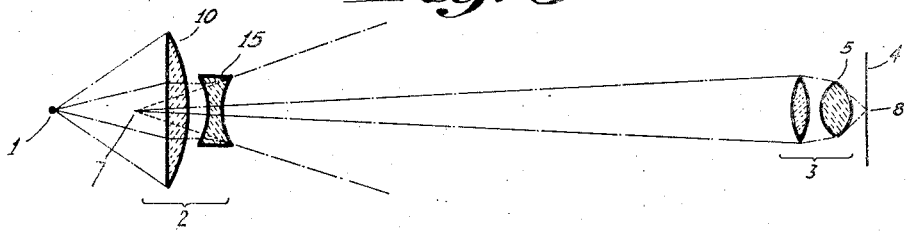
Figure 3 is a vertical section of a modification of Figure 1 employing an objective having a cylindrical component.
Figure 4:
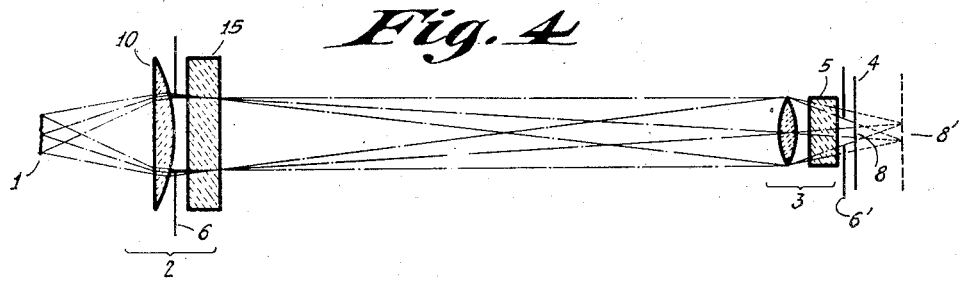
Figure 4 is a horizontal section corresponding to Figure 3.

In the form of the invention shown in Figures 1, 2, and the modifications thereof in Figures 3 and 4, the primary group 2 is composed of two lenses, a spherical lens 10 and a cylindrical lens 15. The spherical lens is of such power, as shown in Figure 2, that it alone would cast an image of the source 1 on the entrance-pupil of the objective 3.

In this as well as in all the following modifications, the source 1 is preferably in the form of a high-intensity lamp filament of the helical type, but it may obviously be of any other appropriate type, such as a small arc-lamp, a linear filament, a Nernst glower, etc.; or it may be a secondary source such as an illuminated aperture, or the reflector of a galvanometer or the equivalent as used in sound-recording apparatus or oscillographs. The objective 3 is shown as a double-convex spherical lens, but ordinarily would be of more complicated form, i. e., a microscope objective or the equivalent would be used. The cylindrical objective shown in Figures 3 and 4 may be constructed as shown, from a positive spherical lens and a positive cylindrical lens 5 of shorter focal length or it may be composed of a microscope objective provided with a cylindrical component, or it may be constructed as shown in my application Serial No. 523,284, filed March 17, 1931.

The negative cylindrical lens 15 is of such focal length that, in combination with the lens 10, it forms a linear image of the source at 7, and this image is smaller in its vertical dimension than the source in the same ratio as the distances of the source and the image from the principal planes of the lens combination. The lateral extent of this image, and thereby the length of the final image 8, is defined by the diaphragm 6.

The objective 3 is so positioned that it focuses an image of the line 7 upon the film or other image area 4 at 8.

In the form shown in Figures 3 and 4, the objective likewise forms a sharp image 8 in the vertical plane, but in the horizontal plane, due to the astigmatic nature of the objective, there is a tendency to form an image at 8' and the ends of the linear image would therefore not be sharply defined. I accordingly place a diaphragm 6' between this lens and the image-area to cut off the marginal rays of less intensity and limit the image to the desired dimension.

Figure 5:
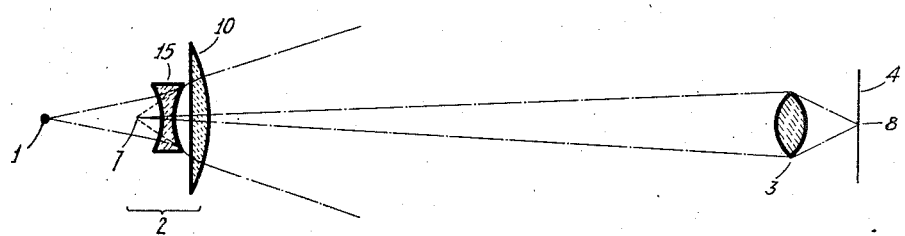
Figure 5 is a vertical section of a second form of the invention.
Figure 6:
Figure 6 is a horizontal section corresponding to Figure 5.
Figure 7:
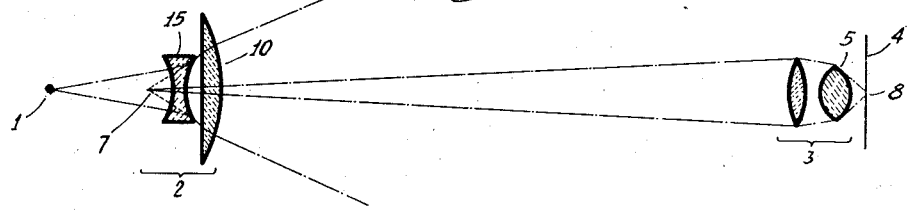
Figure 7 is a vertical section of a modification of Figure 5 employing an objective having a cylindrical component.
Figure 8:
Figure 8 is a horizontal section corresponding to Figure 7.

The form of the invention shown in Figures 5 and 6, and the modification thereof shown in Figures 7 and 8 is, in general, similar in operation to that of Figures 1 and 2 and its modification in Figures 3 and 4. It differs, however, in that I have reversed the positions of the lenses and correspondingly moved the diaphragm 6.

Figure 9:
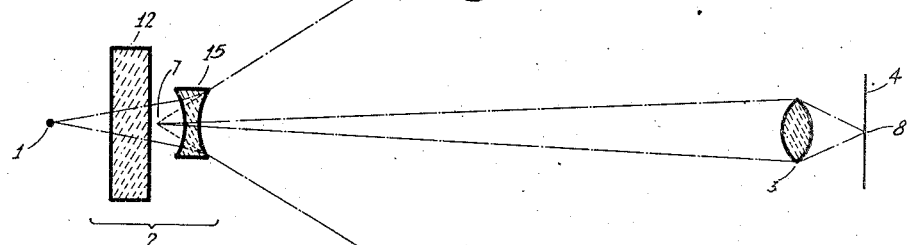
Figure 9 is a vertical section of a third form of the invention.
Figure 10:
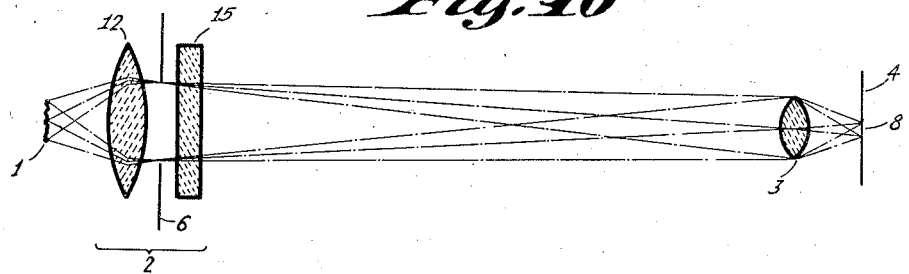
Figure 10 is a horizontal section corresponding to Figure 9.
Figure 11:
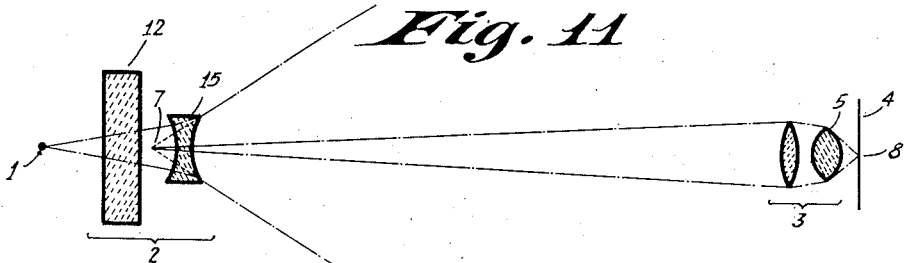
Figure 11 is a vertical section of a modification of Figure 9 employing an objective having a cylindrical component.
Figure 12:
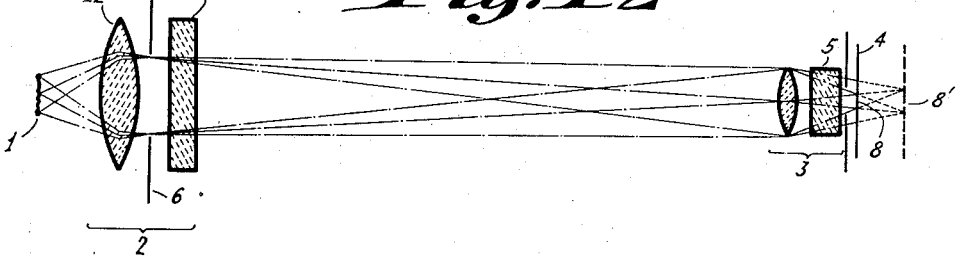
Figure 12 is a horizontal section corresponding to Figure 11.

The form of the invention shown in Figures 9 and 10, and the modification thereof shown in Figures 11 and 12 corresponds to both of the preceding forms but a cylindrical lens 12 is used instead of the spherical lens 10, the refracting powers being changed accordingly.

It will be understood that in this specification, the terms "horizontal" and "vertical" have not been used in any absolute sense of the term but merely as indicating relative position or direction, and that choice between these terms has been determined merely by convenience in illustration.

I claim:

1. A linear-image-forming optical system comprising a plurality of lens components, one of said lens components including a cylindrical negative lens element so located in relation to a light source as to form a virtual linear image, and a positive lens element located with said linear image at a focus thereof, whereby it will converge the rays in the plane defined by the final image and the axis of the system, the other of said lens components being of positive power and located with said linear image at a focus thereof, whereby it will form an image of said linear image on an image area at the other of its conjugate foci.

2. A linear-image-forming optical system comprising a plurality of lens components, one of said lens components including a cylindrical negative lens element so located in relation to a light source as to form a virtual linear image, and a positive spherical lens element constructed and arranged to converge the rays in the plane defined by the final image and the axis of the system, the other of said lens components being of positive power and located with said linear image at a focus thereof, whereby it will form an image of said linear image on an image area at the other of its conjugate foci.

3. A linear-image-forming optical system comprising a plurality of lens components, one of said lens components including a cylindrical negative lens element so located in relation to a light source as to form a virtual linear image, and a positive cylindrical lens element constructed and arranged to converge the rays in the plane defined by the final image and the axis of the system, the other of said lens components being of positive power and located with said linear image at a focus thereof, whereby it will form an image of said linear image on an image area at the other of its conjugate foci.

4. A linear-image-forming optical system comprising a plurality of lens components, one of said lens components including a cylindrical negative lens element so located in relation to a light source as to form a virtual linear image, and a positive lens element of less power constructed and arranged to converge the rays in the plane defined by the final image and the axis of the system, the other of said lens components being of positive power and located with said linear image at a focus thereof, whereby it will form an image of said linear image on an image area at the other of its conjugate foci.

5. A linear-image-forming optical system comprising a plurality of lens components, one of said lens components including a cylindrical negative lens element so located in relation to a light source as to form a virtual linear image, and a positive spherical lens element of less power constructed and arranged to converge the rays in the plane defined by the final image and the axis of the system, the other of said lens components being of positive power and located with said linear image at a focus thereof, whereby it will form an image of said linear image on an image area at the other of its conjugate foci.

6. A linear-image-forming optical system comprising a plurality of lens components, one of said lens components including a cylindrical negative lens element so located in relation to a light source as to form a virtual linear image on an image area between the light source and the cylindrical lens element, and a positive spherical lens element constructed and arranged to converge the rays in the plane defined by the final image and the axis of the system, the other of said lens components being of positive power and located with said linear image at a focus thereof, whereby it will form an image of said linear image at the other of its conjugate foci.

7. A linear-image-forming optical system comprising a plurality of lens components, one of said lens components including a cylindrical negative lens element so located in relation to a light source as to form a virtual linear image between the light source and the cylindrical lens element, and a positive cylindrical lens element constructed and arranged to converge the rays in the plane defined by the final image and the axis of the system, the other of said lens components being of positive power and located with said linear image at a focus thereof, whereby it will form an image of said linear image on an image area at the other of its conjugate foci.

8. A linear-image-forming optical system comprising a plurality of lens components, one of said lens components including a cylindrical negative lens element so located in relation to a light source as to form a virtual linear image, and a positive lens element constructed and arranged to converge the rays in the plane defined by the final image and the axis of the system, the other of said lens components having a positive cylindrical power and being located with said linear image parallel with its axis and at a focus thereof, whereby it will form a linear image of said linear image on an image area at the other of its conjugate foci.

9. A linear-image-forming optical system comprising a plurality of lens components, one of said lens components including a cylindrical negative lens element so located in relation to a light source as to form a virtual linear image, and a positive spherical lens element constructed and arranged to converge the rays in the plane defined by the final image and the axis of the system, the other of said lens components having a positive cylindrical power and being located with said linear image parallel with its axis and at a focus thereof, whereby it will form a linear image of said linear image on an image area at the other of its conjugate foci.

10. A linear-image-forming optical system comprising a plurality of lens components, one of said lens components including a cylindrical negative lens element so located in relation to a light source as to form a virtual linear image, and a positive cylindrical lens element constructed and arranged to converge the rays in the plane defined by the final image and the axis of the system, the other of said lens components having a positive cylindrical power and being located with said linear image parallel with its axis and at a focus thereof, whereby it will form a linear image of said linear image on an image area at the other of its conjugate foci.

11. A linear-image-forming optical system comprising a plurality of lens components, one of said lens components including a cylindrical negative lens element so located in relation to a light source as to form a virtual linear image between the light source and the cylindrical lens element, and a positive cylindrical lens element constructed and arranged to converge the rays in the plane defined by the final image and the axis of the system, the other of said lens components having a positive cylindrical power and being located with said linear image parallel with its axis and at a focus thereof, whereby it will form a linear image of said linear image on an image area at the other of its conjugate foci.

JOHN A. MAURER, Jr.